Patented Dec. 8, 1953

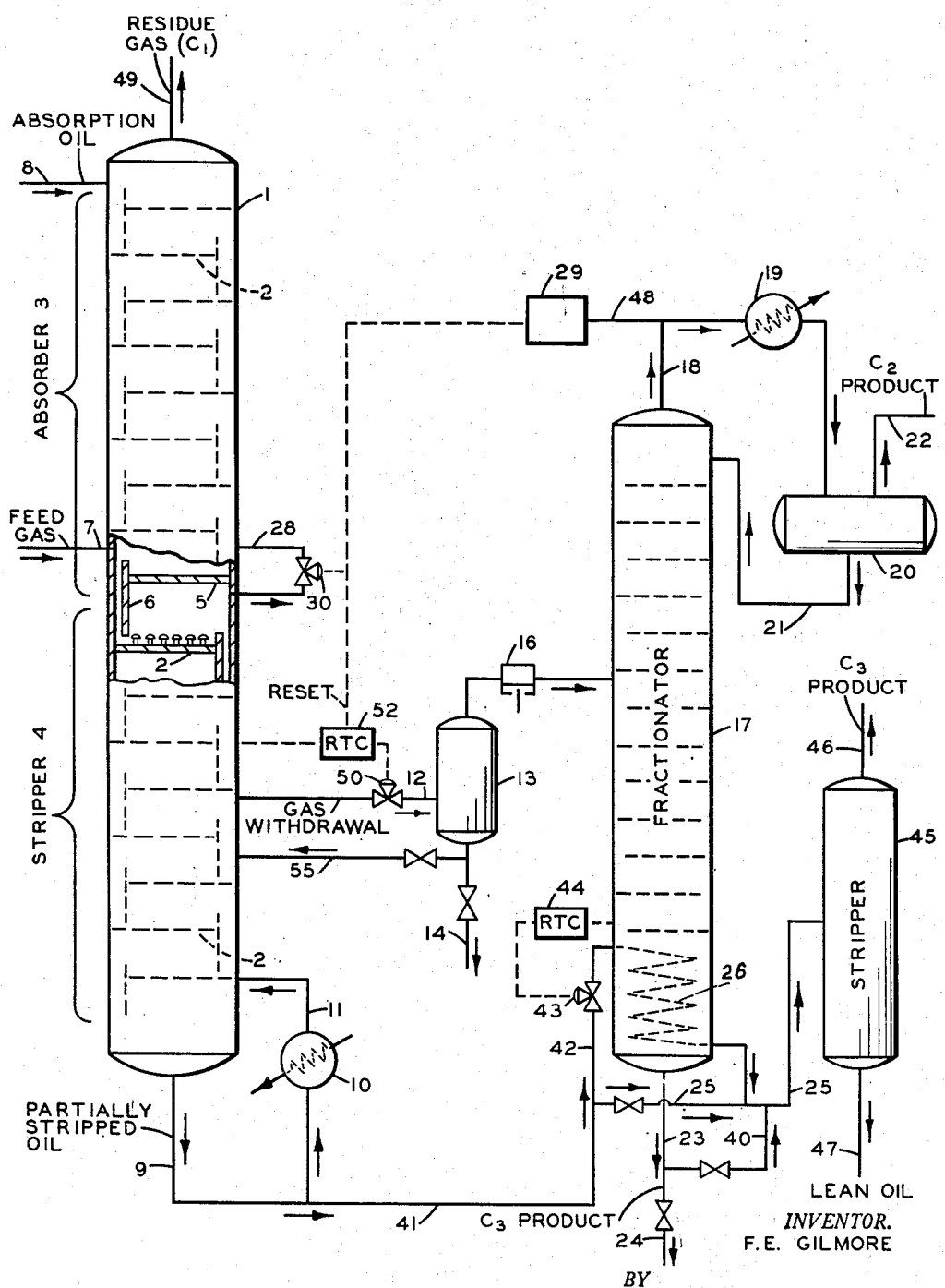

2,661,812

UNITED STATES PATENT OFFICE

2,661,812

PROCESS FOR SEPARATING A GASEOUS MIXTURE

Forrest E. Gilmore, Bartlesville, Okla., assignor to Phillips Petroleum Company, a corporation of Delaware Application January 2, 1951, Serial No. 203,898

8 Claims. (Cl. 183—115)

This invention relates to a process for the separation of organic compounds. In preferred aspects it relates to the separation of mixtures of low molecular weight hydrocarbons. In one of its aspects, it relates to an improved absorption separation process for the separation of a gaseous admixture of lower molecular weight hydrocarbons into one or more fractions thereof.

It is conventional to separate a mixture of lower molecular weight hydrocarbons, such as a mixture of $C_1$ to $C_3$ carbon-atoms-per-molecule hydrocarbons, including saturated and unsaturated hydrocarbons, into desired fractions by conventional fractional distillation processes by effecting the fractionation in a suitable fractionating column under sufficiently low temperatures and/or superatmospheric pressures so as to obtain adequate rectification in the fractionating column.

It is also known to effect separations of such mixtures of gaseous hydrocarbons into at least two fractions by a process wherein the gaseous admixture is contacted with a countercurrent flowing liquid absorbent, or a fluidized solid adsorbent or it is passed through a stationary solid adsorbent mass, with absorption or adsorption, respectively, of certain of the mixture components and separation thereof from the nonabsorbed or the nonadsorbed components. It is known, for example, to effect a partial separation of $C_1$ and $C_2$ hydrocarbons from admixture with $C_3$ hydrocarbons with or without other hydrocarbons by countercurrently contacting the mixture with a hydrocarbon absorption oil in proportions and under conditions to dissolve or absorb at least substantially all of the $C_3$ hydrocarbons, and thus also the higher hydrocarbons, in the oil. The resulting raffinate or unabsorbed $C_1$ and $C_2$ hydrocarbons are used for many purposes, such as for fuel, recycling to gas distillate wells, or as a source of ethylene and ethane for conversion into valuable chemicals, such as ethanol, ethylene glycol, etc. However, in the use of a basic chemical for chemical synthesis, it is necessary to effect a separation of the $C_2$ hydrocarbons from the $C_1$ hydrocarbons, which separation requires additional operations, gas handling processes, equipment, and the like, all of which increase the cost of preparing the $C_2$ hydrocarbons in a suitable concentration and purity.

It is an object of this invention to provide an improved process for the separation and recovery of $C_2$ and $C_3$ hydrocarbons from admixture thereof with $C_1$ hydrocarbons and other light gases.

Another object of this invention is to provide a process for the recovery of $C_2$ hydrocarbons from admixture with $C_1$ and $C_3$ hydrocarbons and/or other low boiling materials with only a minimum loss of said $C_2$ hydrocarbons in admixture with resulting $C_1$ and $C_3$ hydrocarbon fractions.

Still another object of this invention is to separate $C_3$ hydrocarbons from admixture with $C_2$ and $C_1$ hydrocarbons with only a minimum loss of $C_2$ hydrocarbons and/or $C_3$ hydrocarbons in the fraction containing the $C_1$ hydrocarbons.

Still another object of this invention is to provide an improved absorption process for the separation of a given hydrocarbon from admixture with hydrocarbons, some of which are more readily and some less readily absorbed or dissolved in a given absorption medium than the given hydrocarbon.

Yet another object is to separate chemically related organic compounds from each other by an improved absorption fractional distillation procedure.

Other objects and advantages of the present invention will be evident to one skilled in the art upon considering this disclosure and the attached claims.

The process of this invention will now be described generally, as applied to an exemplary mixture of three gaseous hydrocarbons, A, B, and C, where A, B, and C have similar physical properties which vary more or less progressively in degree, A having a given solubility relationship with respect to a hydrocarbon oil absorbent, being relatively more readily absorbed or dissolved than B in said oil and C being readily less absorbed than B in said oil. The process in preferred form comprises countercurrently contacting said mixture and a hydrocarbon oil absorbent therefor in an absorption zone while continuously feeding a stream of said mixture and a stream of said absorbent to opposed ends, respectively, of the absorption zone in relative proportions to ensure substantially complete absorption of components A and B and the absorption of a minor proportion of component C in the absorption oil; passing the resulting fat oil to a stripping zone wherein sufficient heat is supplied to strip components B and C substantially completely from said oil as well as a portion of A but insufficient to strip all of component A therefrom; passing a major proportion of the released component C from the upper portion of said stripping zone to the lower portion of said absorption zone; withdrawing a gaseous fraction comprising components A and B from an intermediate point in said stripping zone; passing the withdrawn components A and B to a fractionating zone and therein separating component A from component B; and controlling the rate of flow of said C component flowing from the upper portion of said stripping zone to the lower portion of said absorption zone in accordance with the composition of the overhead fraction from said fractionating zone in such a manner that said overhead fraction is substantially free from the C component.

Described more specifically with reference to recovery of $C_2$ hydrocarbon component from an exemplary gaseous mixture consisting essentially of methane, $C_2$ hydrocarbons (ethane and/or ethylene) and $C_3$ hydrocarbons (propane and/or propylene) using as an absorbent, for example, a $C_5$ to $C_7$ hydrocarbon oil, the process comprises passing the gaseous mixture upwardly in countercurrent contact with a downwardly flowing body of the absorption oil, the ratio of oil to gas rates and amounts being so selected, as determined by mere routine test familiar to those skilled in the art or by routine calculation based on known factors, such as rate of solution, etc., as to effect substantially complete removal of the $C_3$ and the $C_2$ hydrocarbons and also a minor amount of $C_1$ hydrocarbons from the gas feed to said absorption zone; passing the resulting fat oil containing substantially all of the $C_2$ and $C_3$ hydrocarbons and a minor proportion of the $C_1$ hydrocarbon to a stripping zone and therein stripping from the absorption oil sbstantially all of the $C_2$ and $C_1$ hydrocarbons as well as a portion of the $C_3$ hydrocarbons while permitting the remainder of the $C_3$ hydrocrabons to remain absorbed therein; passing from the upper portion of said stripping zone to the lower portion of said absorption zone a released hydrocarbon fraction comprising predominantly the $C_1$ hydrocarbon released from said absorption oil and a minor portion of $C_2$ hydrocarbons likewise released therefrom; withdrawing from an intermediate point in said stripping zone a gaseous fraction comprising released $C_2$ and $C_3$ hydrocarbons and passing this fraction to a fractionating zone wherein said $C_2$ hydrocarbons are substantially separated from the $C_3$ hydrocarbons; and controlling the rate of flow of said fraction containing said $C_1$ hydrocarbons flowing from the upper end of said stripping zone to the lower end of said absorption zone in accordance with the composition of the overhead fraction from said fractionating zone in such a manner that said overhead fraction contains a minimum amount of said $C_1$ hydrocarbons.

The mixtures of substances to be separated by the present invention may be of various kinds, of more or less chemically and physically related substances, the only requirement being that the substances are vaporizable under conditions employed in the absorption zone and that what can be called an intermediate substance, or group of substances, is present with at least two other substaces or groups of substances, one of which is above and the other below the intermediate substance with respect to ease or rate of being dissolved in or absorbed by a common solvent for said substances. Thus the invention may be applied to the separation of various mixtures which differ in solubility in given common solvents therefor only to a relatively small extent. Thus, a mixture of $C_1$, $C_2$ and $C_3$ hydrocarbons which can contain other constituents vaporizable under the absorption zone conditions such as nitrogen, hydrogen and $C_4$ and/or $C_5$ hydrocarbons can be separated. Also mixtures of $C_2$, $C_3$ and $C_4$ hydrocarbons which can contain heavier and/or lighter vaporizable constituents can be separated. Further, mixtures of other organic substances, such as mixtures of alcohols, of acids, of aldehydes, of ketones, of halogenated hydrocarbons, etc., which mixtures can be readily vaporized under the conditions employed in an absorption zone, can be separated in the practice of this invention using various common solvents which normally, under the conditions of the process, exert only a physical or a reversible chemical action on the substances. Gaseous mixtures of two or more alkenes or alkadienes with at least one alkane or another alkene or alkadiene can be separated in accordance with this invention wherein the common solvent used for at least two of the substances may effect a reversible chemical action therewith, such as ammoniacal copper salt solution, or the like.

As already indicated, this solvent or absorption medium should be chemically inert towards the substances to be separated or, as stated, should not react therewith except for the formation of reversible addition compounds. The ratio of solvent or absorption medium to gaseous mixtures may vary over a considerable range just so long as the ratio is correlated to other variable factors, such as temperature, pressure, length of absorption zone, etc., to ensure substantially complete absorption in the absorption medium of the most readily and next most readily absorbed substances that is, for example, components A and B referred to above, fed to the absorption zone. It will be understood that for a given mixture of substances to be treated, the ratio of solvent-to-mixture to satisfy the above conditions will depend upon the nature of the solvent selected for the process.

The separation process of this invention can be practiced under various temperature and pressure conditions, the selected values of each being determined in each particular case by means of mere routine test or by calculations well known to those skilled in the art. Thus, in the separation of $C_1$, $C_2$, and $C_3$ hydrocarbons from an admixture thereof utilizing a $C_6$–$C_{12}$ hydrocarbon oil absorption medium, the absorption zone can be advantageously maintained at an average temperature of 60° F. and under a pressure of 400 pounds per square inch asbolute. With substances which are normally liquid, the absorption zone would be maintained at a temperature at which the mixture to be separated will be principally in the gaseous or vaporous state, i. e., at a temperature above the bubble temperature of the mixture, which temperature of course will depend upon pressure of the system, which pressure can be atmospheric, subatmospheric, or more preferably, superatmospheric. The stripping zone is preferably operated at a pressure substantially equal to that maintained in the absorption zone. As stated sufficient heat is added to the stripping zone to ensure substantially complete stripping of all except the most readily absorbed component from the absorption medium. Thus, in a $C_1$–$C_2$–$C_3$ system referred to above, the temperature of the oil as it leaves the stripping zone can be in the range of 250 to 500° F. while the oil entering the stripping zone will be at the same temperature as the fat oil effluencing from the absorption zone. In this manner, a temperature gradient and, therefore, a concentration gradient of $C_1$-$C_2$-$C_3$ hydrocarbons is maintained in the stripping zone.

The method of practicing the invention will be described in more detail with exemplary embodiments taken with reference to the accompanying drawing which is made a part of the specification and which is a schematic diagram showing apparatus and flow of materials therethrough for practicing the improved process of this invention.

Referring to the drawing, a vessel 1 containing a plurality of fluid-gas contacting devices such as bubble trays 2 is provided as a combined absorption and stripping zone. The upper absorption zone 3 is divided from the lower stripping zone 4 by means of an imperforate plate 5 and a downcomer 6 extending therethrough in such a manner that no gas can pass upwardly across plate 5 but through which absorption medium can flow downwardly through the downcomer 6. A feed gas comprising, for example, a mixture of $C_1$, $C_2$ and $C_3$ hydrocarbons is passed via line 7 into the absorption zone and passes upwardly therethrough in countercurrent contact with a lean absorption medium introduced into the vessel 1 through line 8. As the absorption medium passes downwardly over the trays 2 and their respective downcomers, the feed gas passes upwardly therethrough intimately contacting the absorption medium by means of such contacting devices as bubble caps situated on trays 2. Unabsorbed gases which comprise, in this instance, the $C_1$ hydrocarbon pass out of the absorption zone through line 49. The rich absorption medium containing absorbed $C_2$ and $C_3$ hydrocarbons, as well as a minor portion of the $C_1$ hydrocarbon introduced in the feed, passes downwardly through downcomer 6 into the stripping section 4. Absorption medium from which substantially all components have been stripped except $C_3$ hydrocarbons leaves stripping zone 4 vias line 9. A portion thereof can be by-passed through heater 10 and returned via line 11 to the lower portion of the stripping zone to provide the necessary heat therein for stripping the rich absorption oil. The amount of heat supplied by means of heater 10 to the by-passed absorption oil in line 11 is such that substantially all of the $C_2$ and $C_1$ hydrocarbons as well as a portion of the $C_3$ hydrocarbons are stripped from the rich absorption oil entering the stripping section and yet insufficient to cause complete stripping of the $C_3$ hydrocarbons from such rich absorption oil.

As the vapors stripped from the oil in the lowermost portion of stripping zone 4 pass upwardly therethrough, they cause lighter hydrocarbon components to be stripped from the descending absorption medium and tend to replace such lighter components in such medium. As a result, there will occur in stripping zone 4 a region in which the $C_2$ hydrocarbons are concentrated in the gaseous phase to the substantial exclusion of $C_1$ hydrocarbons but containing some $C_3$ hydrocarbons. At a point within this region and intermediate the ends of stripping section 4, a gaseous fraction is withdrawn through line 12. Thus, this gaseous fraction comprises predominantly $C_2$ hydrocarbons admixed with some $C_3$ hydrocarbons and being substantially free from $C_1$ hydrocarbons, can be passed to a scrubber 13 from which any entrained absorption oil and/or other liquids can be removed via line 14. Element 13 can be supplied with a scrubbing liquid such as oil or water, or can be merely a knock-out drum. If desired the gas in line 12 can be treated in unit 13 or otherwise for removal of $H_2S$, $CO_2$, and/or $H_2O$. In accordance with a preferred embodiment of the invention the gas in line 12 is cooled and partially condensed, and the condensate collected in unit 13 and returned via line 55 to a point in stripper 4 below the point of line 12 withdrawal. The vaporous effluent from element 13 is passed to a compressor 16 wherein the pressure is increased to such an extent that the compound $C_2$ and $C_3$ hydrocarbon stream can be readily fractionated in a conventional fractional distillation zone 17 wherein the $C_2$'s are separated as an overhead fraction. This overhead fraction is removed via line 18 and can be passed through a cooler 19 to a reflux accumulator 20. Sufficient of the liquid separating in reflux accumulator 20 can be returned to the upper portion of fractional distillation zone 17 via line 21 to serve as reflux therein. A product comprising a concentrated fraction of $C_2$ hydrocarbons can be withdrawn from the reflux accumulator through line 22. The bottoms fraction removed from fractional distillation zone 17 through line 23 comprises a highly concentrated stream of $C_3$ hydrocarbons which can be either sent to storage via line 24 or admixed via line 40 with the stream of rich oil in line 25 derived from stripping zone 4. A portion of the bottoms fraction from fractional distillation zone 17 can be heated and then returned to the lower section of said zone to supply heat thereto. However, preferably the hot absorption oil withdrawn from the bottom of stripper 4 via line 9 is passed via lines 41 and 42 through heating coil 26 located in the bottom of fractionator 17 which is thereby heated to the extent necessary for fractional distillation therein. The extent of heating can be regulated by a valve 43 in line 42 which is controlled by recording temperature controller 44 responsive to the temperature on one of the lowermost trays in fractionator 17.

The absorption medium in line 25, as well as any hydrocarbons admixed therewith from line 23, via line 40 can be passed to a second stripping zone 45 for recovery through line 46 of the $C_3$ and other absorbed hydrocarbons from the absorbent and to recover the absorbent through line 47, which can then be returned to line 8 for reuse in absorption zone 3.

As the stripping action in stripping zone 4 approaches equilibrium throughout the length of the zone, a gaseous fraction comprising predominantly $C_1$ hydrocarbons as well as lesser amounts of $C_2$ hydrocarbons will accumulate in the upper portion of such zone.

This gaseous fraction is withdrawn from the upper portion of stripping zone 4 via line 28 and valve 30 and by-passed around plate 5 to enter the lower portion of absorption zone 3. According to one embodiment of this invention, the rate at which the $C_1$ and $C_2$ hydrocarbons are by-passed around plate 5 via line 28 is controlled by the composition of the overhead fraction from fractional distillation zone 17 in such a manner that a minimum or fixed concentration of $C_1$ hydrocarbon preferably less than 2%, is maintained in the overhead fraction in line 18 or, desirably, so that the overhead fraction is maintained free from $C_1$ hydrocarbon. Thus, for example, the overhead fraction from line 18 or line 22 can be sampled through line 48 and analyzed for methane in known manner by infrared analyzer 29 to produce impulses to be employed to open and close valve 30 which, in turn, will control the rate at which said hydrocarbons are by-passed around plate 5. Alternatively, but less desirably valve 30 can be controlled by means of a thermocouple situated in one of the upper trays of fractional distillation zone 17. In this manner, a change in composition i. e. an increase or a decrease in the amount of $C_1$ hydrocarbon in the liquid on the tray in fractional distillation zone 17 in which the thermocouple is inserted, will cause the valve 30 to open and close in accordance with said change. Thus, for example, when the composition of overhead stream 18 is such as to contain an amount of methane in excess of the selected concentration desired therein, analyzer 29 or said thermocouple will actuate valve 30 to open it to a greater extent thereby permitting more $C_1$ hydrocarbons to by-pass around plate 5. Or vice versa, if the $C_1$ concentration of the overhead stream 18 decreases below the selected concentration, valve 30 will be closed somewhat to correct therefor. While the control line (instrument, air or electrical) from analyzer 29 to valve 30 is shown going direct to a motor valve 30 in the drawing, it will often be most desired to arrange that impulses carried by said control line from analyzer 29 be employed to re-set valve 30 as required in a manner well understood to those skilled in the art. As an additional feature in the control of my process, valve 50 is provided in line 12 to control the withdrawal of the $C_2$-rich gas from stripper 4 to fractionator 17. This valve 50 is controlled by a recording temperature controller 52 responsive to the temperature in stripping zone 4 at a point slightly above the point of gas withdrawal through line 12. As the valve 30 is opened more, permitting more $C_1$-rich vapors to flow from the top of the stripping zone 4 into absorber 3, additional heat is carried up past the point of gas withdrawal represented by line 12. Such additional heat would cause valve 50 to open more, and accordingly recording temperature controller 52 is reset to a higher temperature simultaneously with a resetting or further opening of valve 30 in response to impulses from methane analyzer 29. This arrangement is shown in the drawing; however, alternative arrangements to obtain the same control will be understood by those skilled in the art. Thus, valve 30 can be controlled by a recording differential flow controller responsive to flow through line 26 and reset in response to the methane content in the overhead from fractionator 17 as determined by methane analyzer 29. Valve 50 can be controlled by a rate of flow controller responsive to the flow through line 12, and reset by impulses from the aforesaid differential flow controller operating valve 30 whenever the latter is reset for greater opening of valve 30.

In accordance with one feature of the process of this invention, the hydrocarbon fraction removed from fractional distillation zone 17 through line 23 can be passed in part (by means not shown) to the heated end of stripping zone 4. This hydrocarbon fraction is of the same kind, e. g. a $C_3$ hydrocarbon, as that desirably left in the absorption medium passing through line 9 from stripping zone 4 and hence by thus increasing the concentration of this hydrocarbon in the lower end of the stripping zone 4, lighter hydrocarbon components, such as $C_2$'s or $C_1$'s, absorbed in the absorption medium will be displaced therefrom by the hydrocarbons of the bottoms product from distillation zone 17 thereby resulting in an effluent absorption medium in line of which contains only a minimum of the lighter hydrocarbons such as the said $C_2$'s and $C_1$'s. The optimum amount of hydrocarbons passed from line 23 to stripping zone 4 can be readily determined in any given instance by mere routine test. However, the amount should be sufficient to strip a maximum amount of said lighter hydrocarbon from the absorption medium and any amount in excess of such requirements can pass upwardly through the stripping zone to be again removed via line 12 to distillation zone 17. If desired, according to another feature of this invention, heater 19 can be reduced in size or eliminated by heating that portion of the bottoms product from fractionator 17 thus passed into the bottom of stripper 4 to a temperature sufficient to supply the necessary heat to the stripping zone to effect the desired stripping action therein.

The following examples are typical operations within the scope of the present invention. Those skilled in the art will understand that the different specific conditions and compositions of materials can be varied considerably without departing from the invention in its broadest aspects and accordingly these examples are to be taken as typical and not inclusive of the invention in all respects.

*Example I*

In this example, absorption section 3 is constructed to give 16 theoretical trays, and stripping section 4 is constructed to give 19 theoretical trays. The trays are numbered from top to bottom of the combined absorber-stripper as 1 to 35 inclusive. Sufficient liquid is withdrawn from an intermediate tray in the absorption section, cooled, and returned to the section to obtain an average absorption temperature of 60° F. The combined absorber-stripper is operated at 400 pounds per square inch gauge.

A gasoline fraction, having a molecular weight of about 140 and composed of material boiling from $C_6$ up to an end point of 450° F., is charged as the absorption oil to the top tray of the absorber at 50° F. at a rate of 150 mols per hour. The gas feed to be separated into its components is charged into the bottom of the absorber section at 100° F. and 400 p. s. i. g. This feed has the following composition and is used in the following quantities:

| Component | Mols per Hour |
| --- | --- |
| $C_1$ | 50 |
| $C_2$ | 30 |
| $C_3$ | 20 |
| Total | 100 |

The residue gas withdrawn from the top of the absorber 3 is as follows:

| Component | Mols per Hour |
| --- | --- |
| $C_1$ | 49.99 |
| $C_2$ | 4.20 |
| Total | 54.19 |

The bottom of the stripping section is maintained at about 450° F. by passing a portion of the bottoms product stream through a heater and returning it into the bottom of the stripper: the supply of steam to this heater is controlled by a recording temperature controller in response to the temperature on tray 33 to maintain that temperature constant.

Gas, at about 200° F., is withdrawn from the vapor space between trays 28 and 29, is cooled to 100° F., and passed into a knockout drum from which a liquid having the following composition is withdrawn and returned under liquid level control (responsive to liquid level in the knockout drum) back into the stripper 4 at about the level of tray 32:

| Component | Mols per Hour |
|---|---|
| $C_1$ | .001 |
| $C_2$ | 5.3 |
| $C_3$ | 4.1 |
| $C_6+$ | 2.296 |
| Total | 11.697 |

Gas from the knockout drum is compressed, cooled to 100° F. and passed into an intermediate point of a 30 theoretical plate deethanizer fractionator column operated at 500 p. s. i. g. This gas feed to the deethanizer has the following composition:

| Component | Mols per Hour |
|---|---|
| $C_1$ | 0.01 |
| $C_2$ | 25.30 |
| $C_3$ | 10.10 |
| $C_6+$ | 0.004 |
| Total | 35.414 |

The liquid product from stripper 4 which comprises the absorption oil containing a portion of $C_3$ dissolved therein, has the composition given in the following table, and is partially passed through a heating coil in the base of the deethanizer to maintain the bottom temperature of the deethanizer at 165° F.

| Component | Mols per Hour |
|---|---|
| $C_2$ | 0.5 |
| $C_3$ | 9.9 |
| $C_6+$ | 149.996 |
| Total | 160.396 |

This rich oil is passed to another stripper for separation of the dissolved $C_2$ and $C_3$ hydrocarbon content thereof, from the oil, which is cooled and then returned to the absorber. The vapors from this stripper can be returned either to the absorber or to the deethanizer if desired.

The bottom product from the deethanizer is as follows:

| Component | Mols per Hour |
|---|---|
| $C_2$ | 0.1 |
| $C_3$ | 9.9 |
| $C_6+$ | 0.004 |
| Total | 10.004 |

Total vapors from the top of the deethanizer are withdrawn, cooled to 60° F. which partially condenses the same, and the condensate is collected in a reflux drum and returned to the top as reflux. Flow of reflux is on liquid level control to maintain a constant liquid level in the reflux drum. The gas from the reflux drum represents the $C_2$ product of the separation process, and has the following composition:

| Component | Mols per Hour |
|---|---|
| $C_1$ | 0.01 |
| $C_2$ | 25.2 |
| $C_3$ | 0.2 |
| Total | 25.41 |

This represents 84 per cent $C_2$ recovery. The overhead product is analyzed by an infrared analyzer for methane content, which operates the controls described herein to maintain the methane content below 0.05 per cent.

*Example II*

In this example, the absorption section contains 39 theoretical trays and the total absorber-stripper contains 70 theoretical trays, i. e. the stripping section contains 31 theoretical trays. It is operated at 150 p. s. i. g. The absorber operates at an average temperature of 100° F. and the bottom of the stripper is maintained at 255° F. The same absorption oil is used as in Example I, fed into the absorber at 50 F., at the rate of 1880 mols per hour. The gas feed to the bottom of the absorber at 100° F. is as follows:

| Component | Mols per Hour |
|---|---|
| $H_2, N_2, CO$ | 99.0 |
| Methane | 227.0 |
| $CO_2$ | 21.7 |
| Ethylene | 62.4 |
| Ethane | 96.9 |
| $H_2S$ | 19.8 |
| Propylene | 226.2 |
| Propane | 127.0 |
| Butenes | 103.3 |
| i-Butane | 176.5 |
| n-Butane | 99.4 |
| $C_5+$ | 33.7 |
| Total | 1,292.9 |

Residue gas from the top of the absorber is as follows:

| Component | Mols per Hour |
|---|---|
| $H_2, N_2, CO$ | 99.0 |
| Methane | 225.0 |
| $CO_2$ | 5.7 |
| Ethylene | 15.0 |
| Ethane | 4.0 |
| $H_2S$ | 2.5 |
| Total | 351.2 |

Passage of gas from the top of the stripping section into the bottom of the absorber is on a differential rate of flow control, which is reset in response to the infrared analyzer analyzing the top product of the deethanizer. Withdrawal of $C_2$ gas phase is made from a point below tray 49 in the stripping section, on temperature control responsive to temperature a couple of trays thereabove and giving a temperature of the withdrawn gas of about 110° F. Withdrawal of rich oil from the bottom of the stripper is on liquid level control to keep a constant level in the bottom of the stripper. The liquid product from the bottom of the stripping section, after passing through coils in the bottom of the deethanizer in a quantity to maintain a bottom temperature therein at 217° F. is passed to a separate stripper for removal of absorbed gases (principally $C_3$–$C_4$) from absorption oil. The rich oil before such separation has the following composition:

| Component | Mols per Hour |
|---|---|
| $C_2$ | 4.0 |
| $H_2S$ | 1.5 |
| Propylene | 153.0 |
| Propane | 92.6 |
| Butenes | 91.5 |
| i-Butane | 154.1 |
| n-Butane | 89.8 |
| $C_5+$ | 1,907.7 |
| Total | 2,494.2 |

The $C_2$-rich gas withdrawn from the intermediate point of the stripping section of the absorber-stripper has the following composition:

| Component | Mols per Hour |
|---|---|
| Methane | 2.0 |
| $CO_2$ | 16.0 |
| Ethylene | 47.4 |
| Ethane | 88.9 |
| $H_2S$ | 15.8 |
| Propylene | 73.2 |
| Propane | 34.4 |
| Butenes | 11.8 |
| i-Butane | 22.4 |
| n-Butane | 9.6 |
| $C_5+$ | 6.0 |
| Total | 327.5 |

This gas is given a monoethanolamine scrubbing to remove $H_2S$ and $CO_2$ and is then dehydrated. It is then passed to 200 horsepower compressors. The compressed gas is passed to the deethanizer operated at 500 p. s. i. g. The bottoms product from the deethanizer is as follows:

| Component | Mols per Hour |
|---|---|
| $C_2$ | 5.0 |
| Propylene | 72.3 |
| Propane | 34.0 |
| Butenes | 11.8 |
| i-Butane | 22.4 |
| n-Butane | 9.6 |
| $C_5+$ | 6.0 |
| Total | 161.1 |

The overhead gas from the deethanizer is analyzed for methane by an infrared analyzer which resets the controls on the absorber-stripper so that this methane content is maintained at about 1.5 per cent. The overhead gas is cooled to 40° F. (250 tons refrigeration required), the condensate returned to the top of the deethanizer as reflux, and the uncondensed gas of the following composition recovered as the $C_2$ product:

| Component | Mols per Hour |
|---|---|
| Methane | 2.0 |
| Ethylene | 47.4 |
| Ethane | 83.9 |
| Propylene | 0.9 |
| Propane | 0.4 |
| Total | 134.6 |

While the invention has been described in connection with a present preferred embodiment thereof, it is to be understood that this description is illustrative only and is not intended to limit the invention unduly the scope of which is defined by the appended claims.

I claim:

1. A process for separating a gaseous mixture consisting essentially of $C_1$, $C_2$ and $C_3$ hydrocarbons comprising the steps of: passing said gaseous mixture in counterflowing contact with a liquid hydrocarbon absorption oil for said hydrocarbons in an absorption zone to absorb thereby $C_2$ and $C_3$ hydrocarbons and a portion of said $C_1$ hydrocarbon; passing the resulting fat absorption oil to a stripping zone; in said stripping zone, stripping $C_1$ and $C_2$ hydrocarbons from said adsorption oil while permitting a portion of $C_3$ hydrocarbon to remain absorbed therein; passing a hydrocarbon fraction comprising in a major proportion the released $C_1$ hydrocarbon from the upper portion of said stripping zone to the lower portion of said absorption zone; withdrawing a gas comprising $C_2$ and $C_3$ hydrocarbons from an intermediate point in said stripping zone; passing said gas to a fractionating zone and therein separating said $C_2$ hydrocarbons as an overhead fraction from said $C_3$ hydrocarbon; maintaining said $C_2$ overhead fraction from said fractionation zone free from $C_1$ hydrocarbon by varying the rate flow of said hydrocarbon fraction from said upper portion of said stripping zone to said lower portion of said absorption zone.

2. The process of claim 1 wherein said gas comprising $C_2$ and $C_3$ hydrocarbons is partially condensed, condensate is returned to said stripping zone at a point below the point of said gas withdrawal, and uncondensed $C_2$–$C_3$ gas is passed to said fractionating zone.

3. The process of claim 1 wherein at least a portion of said $C_3$ hydrocarbon separated in said fractionating zone is returned to the lower portion of said stripping zone.

4. The process of claim 2 wherein said returned hydrocarbon is heated prior to passing to said stripping zone to supply heat thereto.

5. A process for separating a gaseous mixture comprising $C_1$, $C_2$ and $C_3$ hydrocarbons comprising the steps of: passing said gaseous mixture in counterflowing contact with a liquid hydrocarbon absorption oil for said hydrocarbons in an absorption zone to absorb thereby said $C_2$ and $C_3$ hydrocarbons and a portion of said $C_1$ hydrocarbon; passing the resulting fat absorption oil to a stripping zone; in said stripping zone, stripping said $C_1$ and $C_2$ hydrocarbons from said absorption oil while permitting a portion of $C_3$ hydrocarbon to remain absorbed therein; passing a hydrocarbon fraction comprising in a major proportion the released $C_1$ hydrocarbon from the upper portion of said stripping zone to the lower portion of said absorption zone; withdrawing a gaseous fraction comprising $C_2$ and $C_3$ hydrocarbons from an intermediate point in said stripping zone; separating said withdrawn fraction into its respective components; maintaining said withdrawn fraction from said stripping zone free from $C_1$ hydrocarbon by varying the rate of flow of said hydrocarbon fraction from said upper portion of said stripping zone to said lower portion of said absorption zone.

6. The process of claim 5 wherein the rate of withdrawal of said gaseous fraction comprising $C_2$ and $C_3$ hydrocarbons is controlled in response to the temperature of said stripping zone in the neighborhood of the point of said withdrawal, and said control temperature varied as a direct function of the controlled rate of flow of hydrocarbon fraction from said upper portion of said stripping zone to said lower portion of said absorption zone.

7. A process for separating a gaseous mixture comprising $C_1$, $C_2$ and $C_3$ hydrocarbons comprising the steps of: passing said gaseous mixture in counterflowing contact with a liquid absorption medium for said hydrocarbons in an absorption zone to absorb thereby said $C_2$ and $C_3$ hydrocarbons and a portion of said $C_1$ hydrocarbon; passing the resulting fat absorption medium to a stripping zone; in said stripping zone stripping $C_1$ and $C_2$ hydrocarbons from said absorption medium while permitting $C_3$ hydrocarbon to remain absorbed therein; passing a hydrocarbon fraction comprising in major proportion released $C_1$ hydrocarbon from the upper portion of said stripping zone to the lower portion of said absorption zone; withdrawing a gaseous fraction comprising $C_2$ and $C_3$ hydrocarbons from an intermediate point in said stripping zone; maintaining said withdrawn fraction from said stripping zone at a selected minimum concentration of $C_1$ hydrocarbon by varying the rate of flow of said hydrocarbon fraction from said upper portion of said stripping zone to said lower portion of said absorption zone.

8. A process for fractionating a vaporizable mixture consisting essentially of chemically related organic compounds A, B, and C which decrease in order named in their readiness for being reversibly absorbed in a common liquid absorption medium therefor, which comprises: passing said mixture in the vapor state in counterflowing contact with said liquid absorption medium in an absorption zone to absorb thereby a major proportion of said A and B compounds and a minor proportion of said C compound; stripping the resulting fat absorption medium in a stripping zone to an extent sufficient to strip B and C compounds therefrom while permitting a portion of A compound to remain absorbed therein; removing a desorbed gaseous fraction comprising A and B from said stripping zone at a point intermediate its ends; fractionally distilling said removed fraction to recover B compound as an overhead fraction; and passing a gaseous fraction comprising B and C compounds from an upper portion of said stripping zone to a lower portion of said absorption zone at a rate sufficient to maintain said B compound overhead fraction free from said C compound.

FORREST E. GILMORE.

References Cited in the file of this patent

UNITED STATES PATENTS

| Number | Name | Date |
|---|---|---|
| 2,160,163 | Nichols et al. | May 30, 1939 |
| 2,451,136 | Wenzke | Oct. 12, 1948 |
| 2,563,543 | Miller et al. | Aug. 7, 1951 |